United States Patent [19]

Carminati

[11] 3,908,729
[45] Sept. 30, 1975

[54] MACHINE FOR SCREWING THE NUTS OF WHEEL-SPOKES

[76] Inventor: Julien Carminati, 13, Avenue du Thiou, 74 Annecy, France

[22] Filed: Oct. 11, 1973

[21] Appl. No.: 405,850

[30] Foreign Application Priority Data
Oct. 11, 1972  France .............................. 72.39982

[52] U.S. Cl. ............................ 157/1.5; 29/159.02
[51] Int. Cl.² ......................................... B23P 19/00
[58] Field of Search .................. 157/1.5; 29/159.02; 173/12

[56] References Cited
UNITED STATES PATENTS

| | | |
|---|---|---|
| 610,652 | 9/1898 | Hurst et al. .......................... 157/1.5 |
| 1,921,223 | 8/1933 | Eksergian ........................ 29/159.02 |
| 3,636,614 | 1/1972 | Damman et al. .................... 157/1.5 |

Primary Examiner—Al Lawrence Smith
Assistant Examiner—Harold P. Smith, Jr.
Attorney, Agent, or Firm—Stevens, Davis, Miller & Mosher

[57] ABSTRACT

A machine for screwing down the spoke nuts of a bicycle wheel while controlling the torque applied to each nut in response to the position of the nut on the wheel in relation to the order of tightening of the nuts. The torque applied is progressively greater from nut to nut starting from the first until a maximum torque is applied after the spokes over half the wheel circumference have been tightened.

6 Claims, 1 Drawing Figure

U.S. Patent   Sept. 30,1975   3,908,729
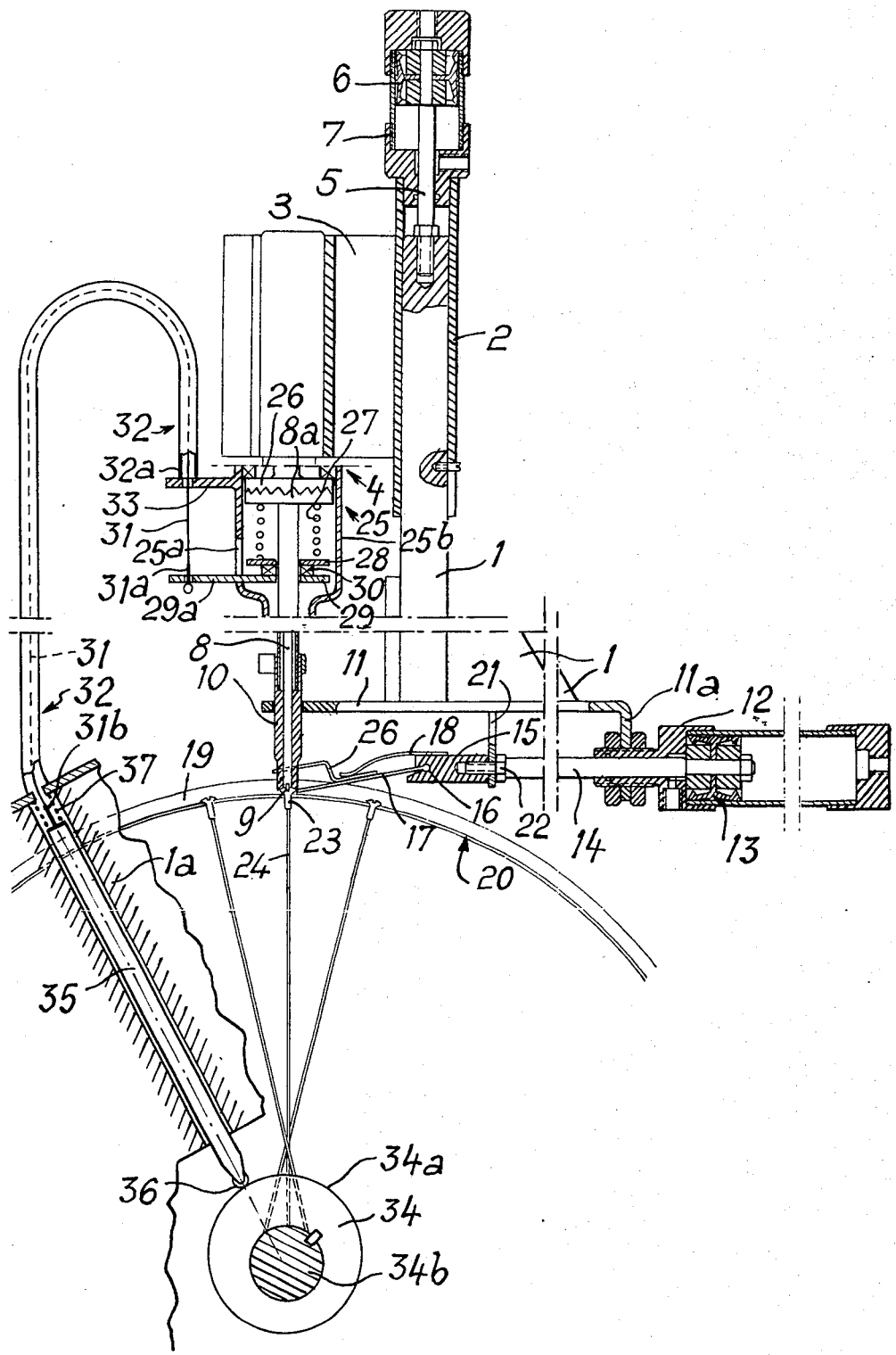

MACHINE FOR SCREWING THE NUTS OF WHEEL-SPOKES

The present invention relates to an improvement to machines for screwing the nuts or nipples of wheel-spokes, especially for bicycles, of the type comprising a screwing head, provided at its end with a screwdriver and mounted in a telescopic guide sleeve and capable of sliding under the action of a jack on a support element along the axis of each spoke coming opposite the screwdriver as the wheel itself is driven stepwise by means of a pawl driven by a jack following a direction substantially perpendicular to the direction in which the synchronized screwing head slides.

In known machines of this type, the nuts or nipples are screwed using a torque which is constant and identical for all the nuts. As a result, when the first nuts to be screwed are being screwed by these known machines, the corresponding spokes are pulled to the maximum extent towards the periphery of the wheel, because the other spokes, especially the spokes opposite the first nuts to be screwed, are not yet subjected to compensating traction by tightening of their nuts. As a result of this, any already existing errors in assembly, such as eccentricity between the axis and the body of the hub of the wheel, are worsened by the tendency of the wheel rim towards radial displacement while the spokes are loose.

The invention aims to remedy this disadvantage and has in particular the object of providing a machine by means of which the spoke nuts are screwed on with a torque which can be varied as the screwing up cycle of the wheel takes place.

For a machine of the abovementioned type, this aim is achieved in accordance with the invention by the fact that the screwing head comprises an adjustable torque regulator of which the adjusting component is connected by means of a suitable transmission device to the contour of a cam connected so as to rotate with the wheel, in such a way that the screwing torque is adjusted, for each nut in the wheel spoke, to a value which is a function of the place of the nut in the order in which the nuts are screwed on.

Thus in this new machine, the screwing torque of the nuts can be adjusted automatically, by using a cam of a suitable contour, to a minimum value for the first nuts screwed on and then to values which gradually increase until a maximum value is reached on the last third of the wheel.

In order that the present invention may more readily be understood, the following description is given merely by way of example, with reference to the attached drawing in which the sole FIGURE is a view in side elevation and in partial cross-section of the preferred embodiment of a spoke screwing machine according to the invention.

The drawing shows a machine for screwing the nuts of wheel spokes, comprising a fixed support element 1 on which is mounted, so as to slide vertically, a tubular component 2 of a bracket 3 which carries a screwing head 4 of a known type, for example a pneumatically controlled head. A rod 5 carrying a piston 6 slidable within a jack cylinder 7 is firmly fixed to the tubular component 2 which carries the screwing head 4 and is fixed to the upper part of the support element 1 in such a way that the jack 7 drives the screwing head 4 which is in turn mounted so as to slide on the support element 1.

The screwing head 4 comprises a rod 8 which ends in a screwdriver blade 9 and is located in a telescopic guide sleeve 10.

The support 1 is provided at its lower end with a plate 11 which carries on a perpendicular extension 11a a jack cylinder 12 in which a piston 13 is slidably mounted. The piston 13 is firmly fixed to a rod 14 one end of which fixedly carries a fixed lug 15 having a seat 16 in which is pivotally mounted a pawl blade 17 which is subject to the action of a leaf spring 18 intended to keep the blade 17 against the rim 19 of a bicycle wheel 20.

A small guiding and spacing plate 21 is fixed by a screw 22 to the lug 15 and slides over the lower face of the plate 11.

The pawl blade 17 is thus kept in contact with the rim 19 of the wheel 20 by the action of the leaf spring 18 and is driven by the jack 12 to reciprocate in a horizontal direction perpendicular to the axis of the rod 8 of the screwing head 4.

When the pawl blade 17 is in its extreme right-hand position a V-shaped aperture of the end of blade 17 comes into contact with one of the nuts 23 previously mounted on the spokes 24 of the wheel 20, so that leftward movement of the blade drives the wheel 20 through a certain angle to bring the nut 23 into the tightening position directly below and in alignment with the screwdriver blade 9, as shown in the FIGURE.

When the assembly is in this position, the jack 7 is activated to cause the rod 8 of the screw driver to descend bringing the blade 9 into engagement with the slit of the nut 23 in order to carry out the screwing operation.

The movements of the screwdriver and of the piston 13 for stepwise forward movement of the wheel are synchronized so as to allow a machine to work automatically.

The screwing head 4 comprises an adjustable torque limiter 25 which, in the example represented, is of the friction type. As can be seen on the FIGURE, the screwing rod 8 comprises at its upper end situated within the torque limiter 25 a disc 8a which is held so as to rest with adjustable pressure against a driving disc 26 by means of a spring 27 which rests on the one hand against the disc 8a and on the other hand against a disc 28 which slides on the rod 8. The regulating element of the torque limiter 25 is formed as a control disc 29 which slides on the rod 8 and which is capable of compressing the spring 27 by acting on the pressure disc 28 by means of an annular thrust bearing 30. For this purpose, the control disc 29 has a lateral attachment 29a which receives one end 31a of the core 31 of a Bowden cable 32. A suitable aperture 25a is machined in a casing 25b of the torque limiter 25, in order to allow the disc 29 and its attachment 29a to move in translation along the axis of the rod 8. The semi-rigid guide sheath 32a of the Bowden cable 32 is fixed to the casing 25b of the torque limiter 25 by means of a suitable lateral attachment lug 33.

As can be seen in the FIGURE, the adjusting element 29 of the torque limiter 25 is thus operably connected, in this case by means of a Bowden cable 32, to the circumference 34a of a cam 34 connected so as to rotate with the wheel 20. The cam 34 is arranged and formed in such a way that the screwing torque is regulated, for each spoke nut 23 of the wheel 20, to a value which is a function of the position of the nut 23 in the order in which the nuts are screwed.

The core 31 of the Bowden cable 32 is attached, at its end 31b away from the torque limiter 25, to the end of a cam follower member 35 which is guided axially on a fixed slide 1a extending radially relative to the shaft 34b of the cam 34 and the part 35 carries at its other end a cam follower roller 36. The roller 36 is kept in contact with the circumference 34a of the cam 34 by means of a helicoidal compression spring 37 interposed between the cam follower member 35 and the slide 1a.

The cam 34 has an eccentric circular circumference 34a and is keyed on the shaft 34b which also supports the wheel 20.

Thus, as can be seen in the FIGURE, the eccentric cam 34 is located on the shaft 34b in such a way that the first nuts 23 which arrive in front of the screwdriver 8,9, are screwed with minimum torque, this screwing torque increasing as the wheel 20 turns and reaching its maximum value for the nuts 23 which are located substantially opposite the first nuts which have been screwed on. Later nuts are screwed with progressively decreasing torque values.

The torque limiter 25 used can in particular be of any other type, for example electrical or electronic. The transmission device can in the same way also be of the electrical or electronic type instead of the Bowden cable 32 shown.

I claim:

1. A machine for tightening the nuts of wheel spokes, comprising a spoke nut tightening station, means for rotatably supporting a wheel the spokes of which are to be tightened so that the spoke nuts pass said nut tightening station, means at the tightening station for engaging the spoke nuts in turn, means driving said nut engaging means for nut tightening rotation, adjustable torque limiting means in said driving means, means for controlling the maximum torque to be applied to said nut engaging means in response to the rotation of said wheel supporting means for sequentially varying the applied torque from nut to nut according to the positioning of each nut in the order of tightening, and means for driving the wheel supporting means for stepwise rotation to bring the individual nuts in register with said nut tightening station, said means for controlling including a cam coaxial with said wheel supporting means and means for connecting said cam to a wheel carried by said wheel supporting means.

2. A machine as set forth in claim 1 wherein said torque limiting means includes an adjusting element, a cam follower mounted for operable engagement with said cam, a Bowden cable means having a core fixed at one end to said cam follower and at the other end to said adjusting element, and fixed slide means mounting said cam follower for movement radially of the axis of rotation of the cam.

3. A machine as set forth in claim 1, wherein said cam has an eccentric circular contour, and said wheel supporting means has a support shaft keyed to the cam.

4. A machine for tightening the nuts of wheel spokes, comprising a spoke nut tightening station, means for rotatably supporting a wheel the spokes of which are to be tightened so that the spoke nuts pass said nut tightening station, means at the tightening station for engaging the spoke nuts in turn, means driving said nut engaging means for nut tightening rotation, adjustable torque limiting means in said driving means, means for controlling the maximum torque to be applied to said nut engaging means in response to the rotation of said wheel supporting means for controlling the applied torque according to the positioning of each nut in the order of tightening, means for driving the wheel supporting means for stepwise rotation to bring the individual nuts in register with said nut tightening station, said means for controlling including a cam coaxial with said wheel supporting means, and means for connecting said cam to a wheel carried by said wheel supporting means.

5. A machine as set forth in claim 4 wherein said torque limiting means includes an adjusting element, a cam follower mounted for operable engagement with said cam, a Bowden cable means having a core fixed at one end to said cam follower and at the other end to said adjusting element, and fixed slide means mounting said cam follower for movement radially of the axis of rotation of the cam.

6. A machine as set forth in claim 4, wherein said cam has an eccentric circular contour, and said wheel supporting means has a support shaft keyed to the cam.

* * * * *

UNITED STATES PATENT AND TRADEMARK OFFICE
CERTIFICATE OF CORRECTION

PATENT NO. : 3,908,729
DATED : September 30, 1975
INVENTOR(S) : Julien Carminati It is certified that error appears in the above—identified patent and that said Letters Patent are hereby corrected as shown below:

Item [30] Foreign Application Priority Data, should read as follows:

--- November 10, 1972   France...............72.39982 ---.

Signed and Sealed this seventeenth Day of February 1976

[SEAL]

Attest:

RUTH C. MASON
*Attesting Officer*

C. MARSHALL DANN
*Commissioner of Patents and Trademarks*